(12) United States Patent
Chen

(10) Patent No.: US 7,854,507 B1
(45) Date of Patent: Dec. 21, 2010

(54) EYEGLASS DEVICE WITH A DETACHABLE LENS UNIT

(76) Inventor: Chih-Ming Chen, No. 19, Aly. 4, Ln. 234, Sec. 5, Hewei Rd., North Dist., Tainan City 704 (TW)

( * ) Notice: Subject to any disclaimer, the term of this patent is extended or adjusted under 35 U.S.C. 154(b) by 0 days.

(21) Appl. No.: 12/560,492

(22) Filed: Sep. 16, 2009

(51) Int. Cl.
*G02C 1/04* (2006.01)
(52) U.S. Cl. .................. 351/103; 351/106; 351/131
(58) Field of Classification Search .............. 351/41, 351/44, 103–109, 124–135, 154, 178
See application file for complete search history.

(56) References Cited

U.S. PATENT DOCUMENTS 6,280,030 B1 * 8/2001 Chen .......................... 351/86
6,939,004 B1 * 9/2005 Chen .......................... 351/106

* cited by examiner

*Primary Examiner*—Huy K Mai
(74) *Attorney, Agent, or Firm*—Alan Kamrath; Kamrath & Associates PA

(57) ABSTRACT

An eyeglass device with a detachable lens unit has a frame and a lens unit. The frame has a first end and a second end in width each connecting to a foot, and has an intermediate between the first and second ends extending out a connecting base with a recess. The lens unit comprises two lenses and a connecting piece between the two lenses to snugly engage with the recess of the frame. Thereby, the lens unit and the frame are combined together and positioned and thus the attachment or detachment of the eyeglass device is convenient.

6 Claims, 7 Drawing Sheets

EYEGLASS DEVICE WITH A DETACHABLE LENS UNIT

BACKGROUND OF THE INVENTION

1. Field of the Invention

The present invention relates to an eyeglass device, and more particularly to an eyeglass device having a detachable lens unit.

2. Description of Related Art

Accompany with improvement of material life, people pursuing new things and trend pay more attention on their accessories. Take ordinary pairs of spectacles as examples, sunglasses or casual glasses are getting popular to make people looked stylish and to match with their outfits.

Because the sunglasses and casual glasses focus on fancy appearance and various modifications, thus users usually change spectacles to reflect their moods or to match their clothing. However, such sunglasses or casual glasses cannot have much modification on rear feet, which are thin sticks, but the lens and frame in front of the face show most characteristics of the spectacle. Thus, it is not economic for users to change the whole set of spectacles because they have to buy many pairs to satisfy their needs.

Some manufacturers create spectacles with beautiful appearance for replacing, which substantially comprises a frame having a groove at an inner periphery and lens corresponding to the groove. When the pair of spectacles is assembled, the lens has to be wedged into the groove hard and technically to keep the lens or frame from damaging. Correspondingly, when the lens must be exchanged some days later, the lens has to be pulled out from the groove hard again in such an inconvenient way.

SUMMARY OF THE INVENTION

A main objective of the present invention is to provide an eyeglass device with a detachable lens unit that is convenient and easy in detachment or attachment operation.

To achieve the foregoing objective, the eyeglass device with a detachable lens unit comprises a frame having a first end and a second end respectively connecting to a foot;

an intermediate between the first end and the second end having an upper edge or a lower edge in height direction and an inner surface and an outer surface in thickness direction;

a connecting base extends from the intermediate and having a recess extending from an interior surface of the connecting base to an outside surface of the connecting base but not reaching the outside surface, wherein the recess further has an opening, a top and a bottom of the opening, and two flanges respectively formed on the top and bottom of the opening;

a lens unit having two lenses and a connecting piece bridging between the two lenses;

the connecting piece having a top and a bottom in height direction and a first surface and a second surface in thickness direction, wherein the first surface faces the inner surface on the intermediate of the frame and the second surface has two grooves respectively defining at the top and the bottom of the connecting piece to engage the flanges of the frame.

Further benefits and advantages of the present invention will become apparent after a careful reading of the detailed description with appropriate reference to the accompanying drawings.

DETAILED DESCRIPTION OF THE PREFERRED EMBODIMENT

An eyeglass device with a detachable lens unit in accordance with the present invention comprises a frame and a lens unit. The frame has a first end and a second end in width each connecting to a foot, and has an intermediate between the first and second ends extending out a connecting base with a recess. The lens unit comprises two lenses and a connecting piece between the two lenses to snugly engage with the recess of the frame. Thereby, the lens unit and the frame are combined together and positioned and thus the attachment or detachment of the eyeglass device is convenient.

Figure 1:
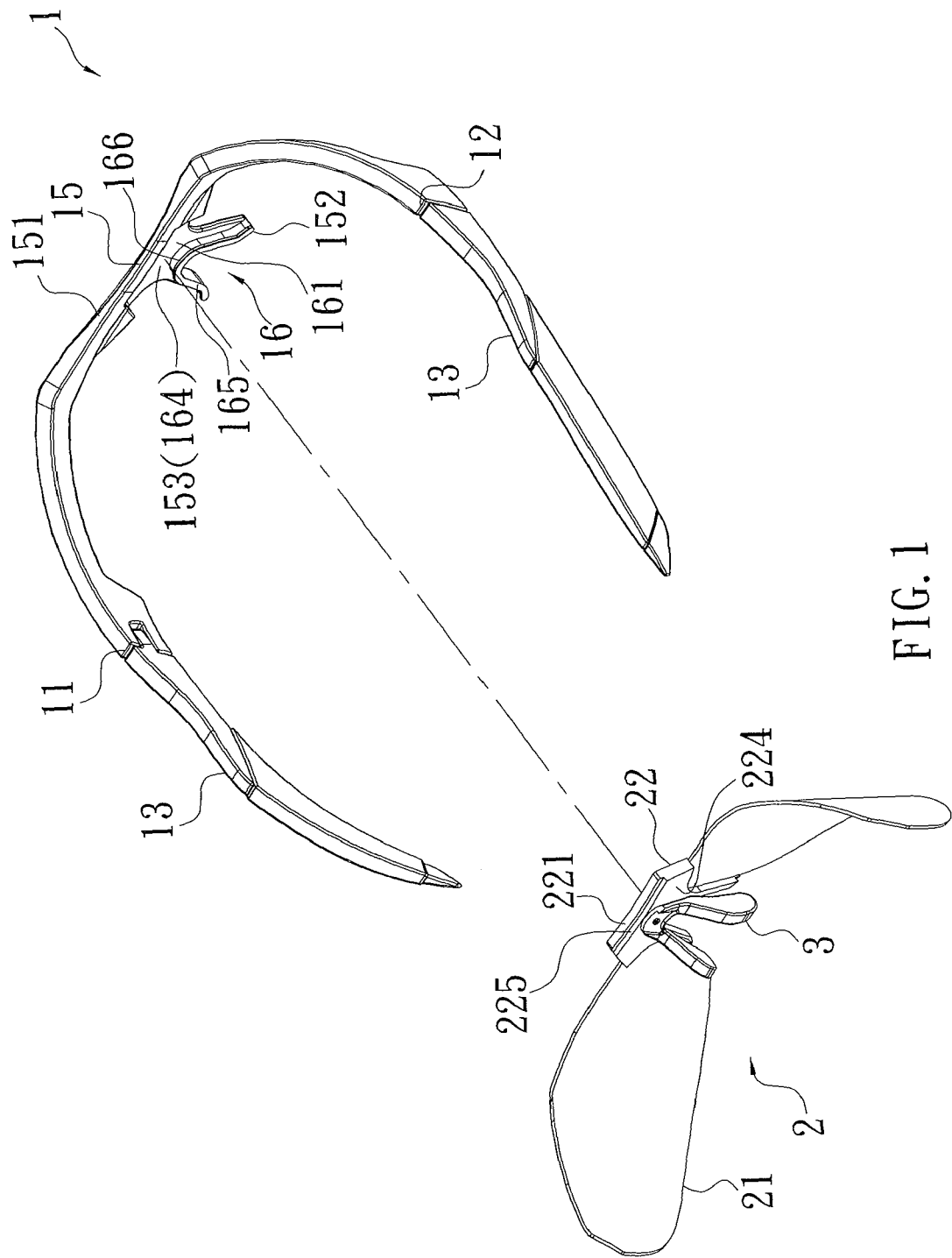
FIG. 1 is an exploded perspective view of an eyeglass device with a detachable lens unit in accordance with the present invention.
Figure 2:
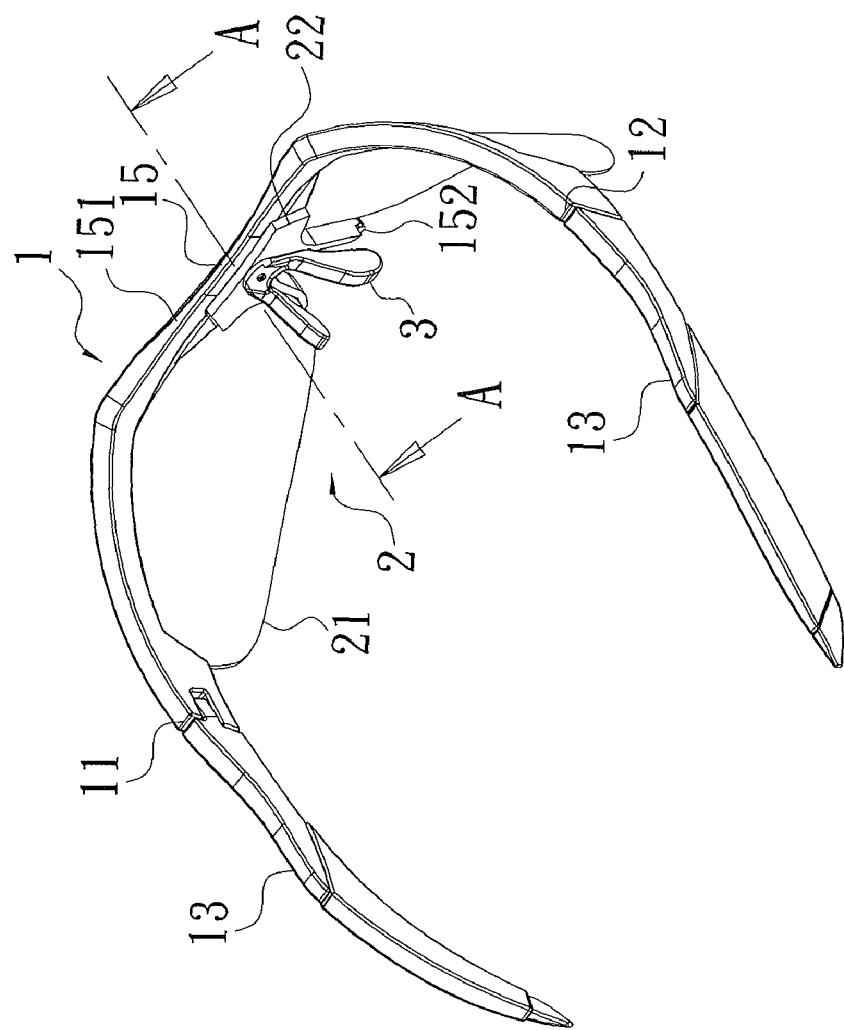
FIG. 2 is a perspective view showing a combination of the eyeglass device in FIG. 1.
Figure 3:
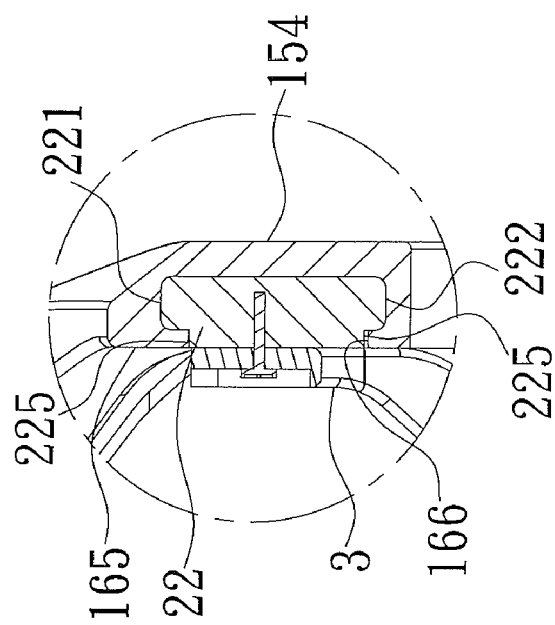
FIG. 3 is a side view of the eyeglass device with a partially enlarged cross-sectional side view showing the joint of a frame and a lens unit along line A-A in FIG. 2.
Figure 3:
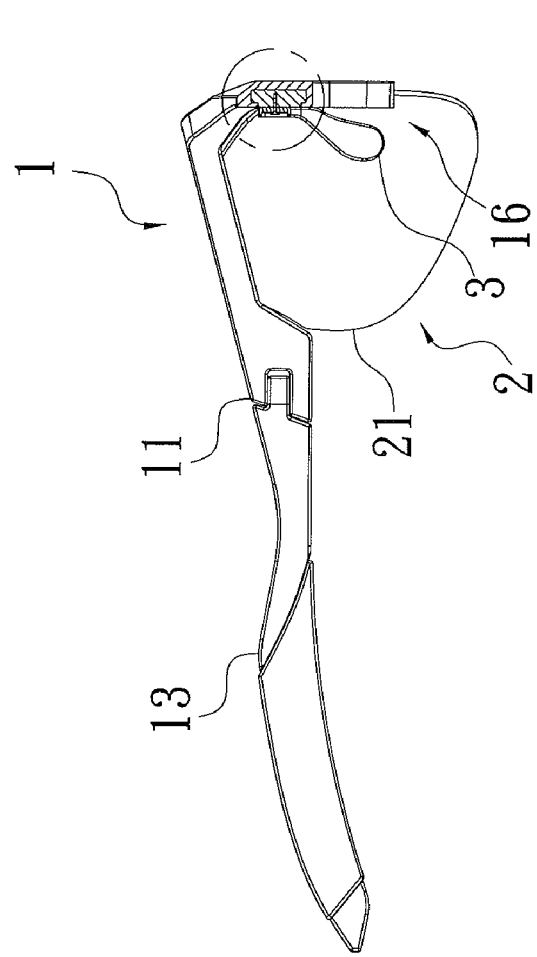

As shown in FIGS. 1 to 3, a preferred embodiment of the eyeglass device comprises a frame 1 and a lens unit 2.

Figure 4:
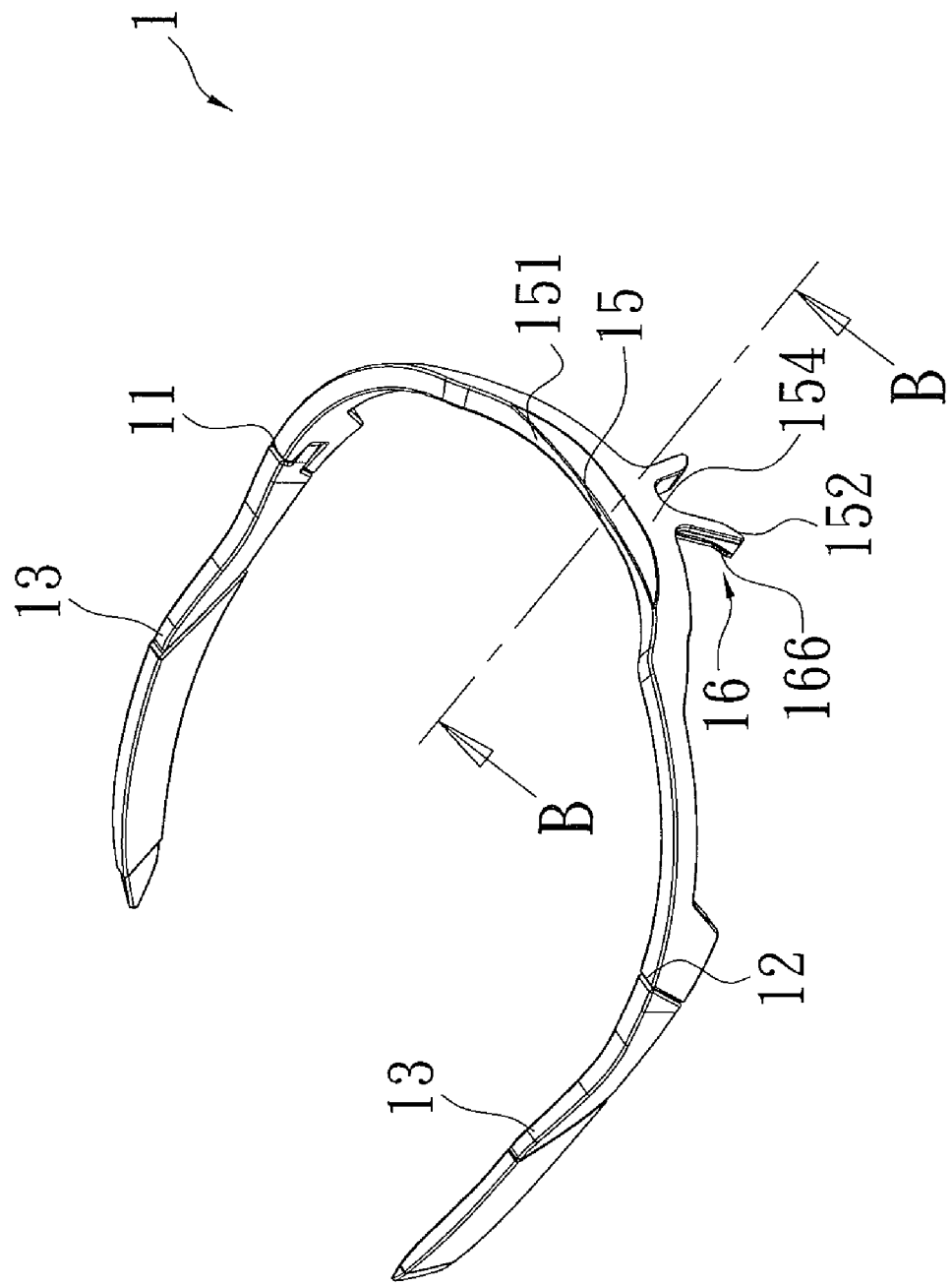
FIG. 4 is a perspective front view of the eyeglass device without the detachable lens unit.
Figure 5:
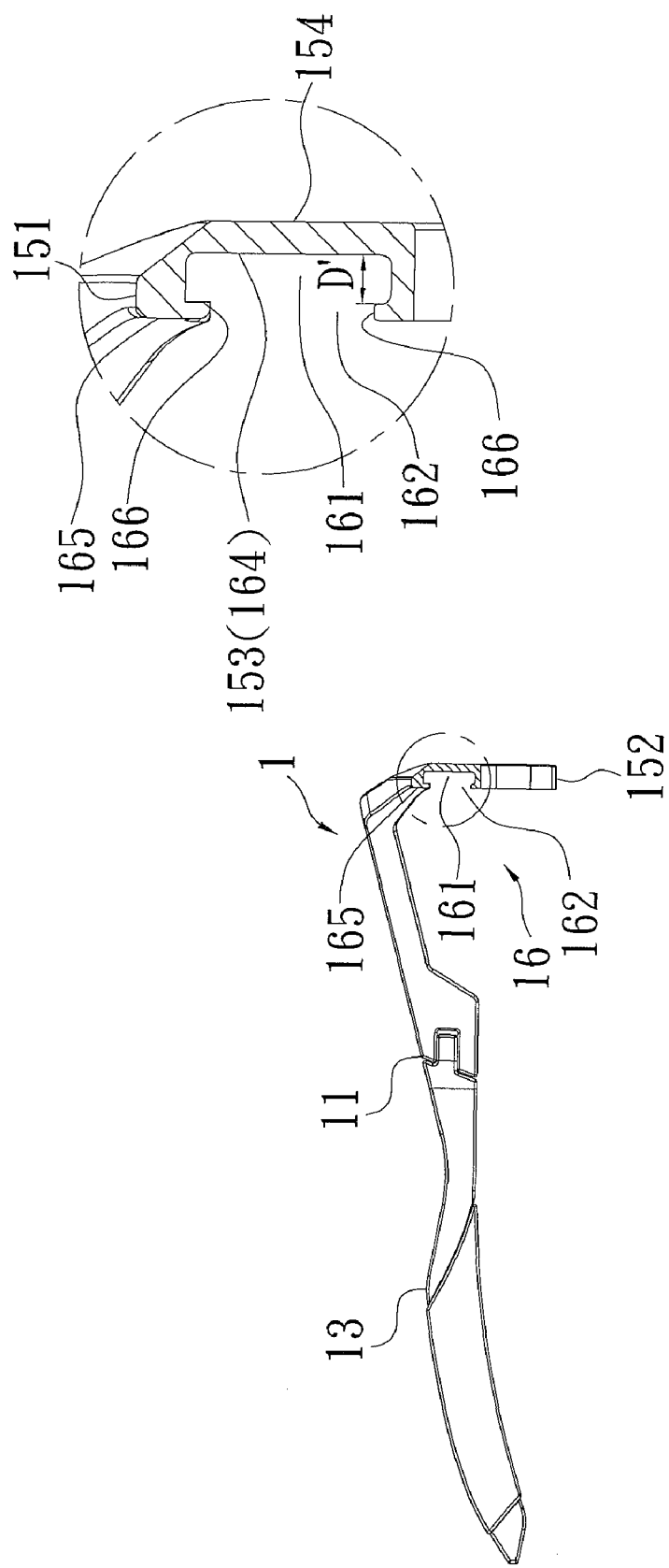
FIG. 5 is a side view of the frame of the eyeglass device with a partially enlarged cross-sectional side view showing an intermediate of the frame along line B-B in FIG. 4.

The frame 1 has a first end 11 and a second end 12 in length direction each connecting to a foot 13. The frame 1 further comprises an intermediate 15 connected between the first end 11 and the second end 12. The intermediate 15 has an upper edge 151 and a lower edge 152 in height direction and further has an inner surface 153 and an outer surface 154 (as shown in FIG. 4) in thickness direction. The intermediate 15 extends out a connecting base 16, which has a recess 161 defined inside the connecting base 16. The recess 161 extends from an interior surface 164 of the connecting base 16 to an outside surface 165 of the connecting base 16 but not reaches the outside surface 165. In this preferred embodiment, the interior surface 164 is same as the inner surface 153 on the intermediate 15 of the frame 1. The recess 161 has an opening 162 (as shown in FIG. 5) defined on the outside surface 165. The opening 162 further has flanges 166 respectively formed at its top and bottom. The recess 161 further has a Distance D' in thickness direction (as shown in FIGS. 4 and 5).

Figure 6:
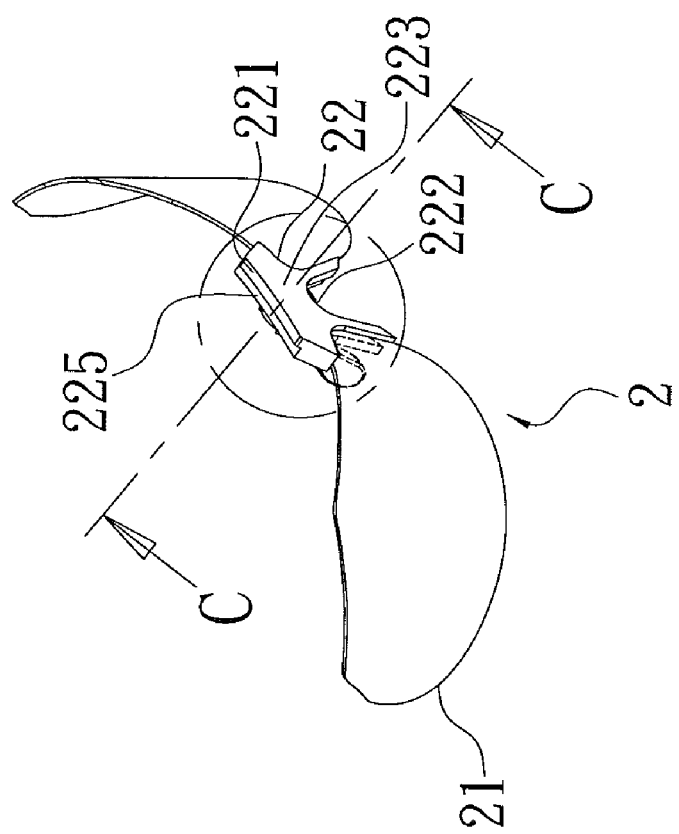
FIG. 6 is a perspective front view of the detachable lens unit with an enlarged perspective view showing a connecting piece on the detachable lens unit.
Figure 6:
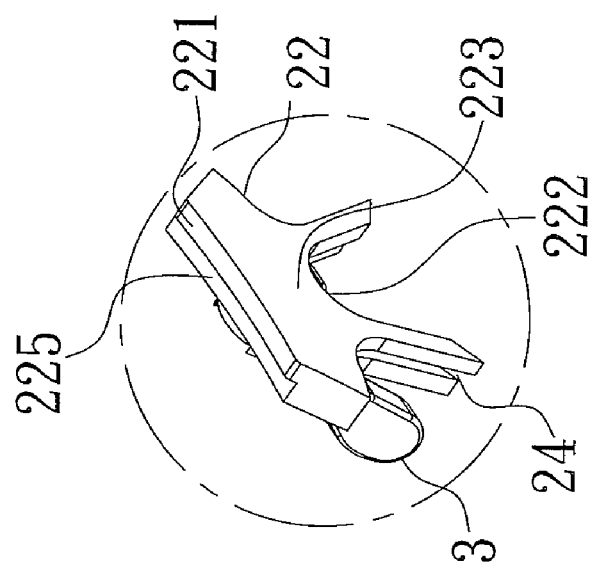
Figure 7:
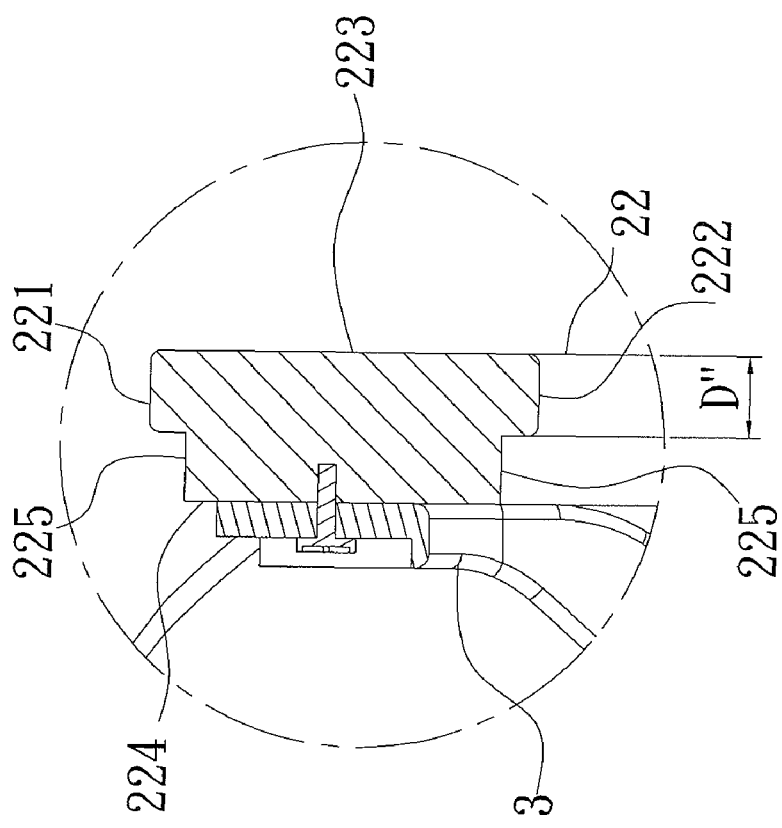
FIG. 7 is a side view of the detachable lens unit of the eyeglass device with a partially enlarged cross-sectional side view showing the connecting piece along line C-C in FIG. 6.
Figure 7:
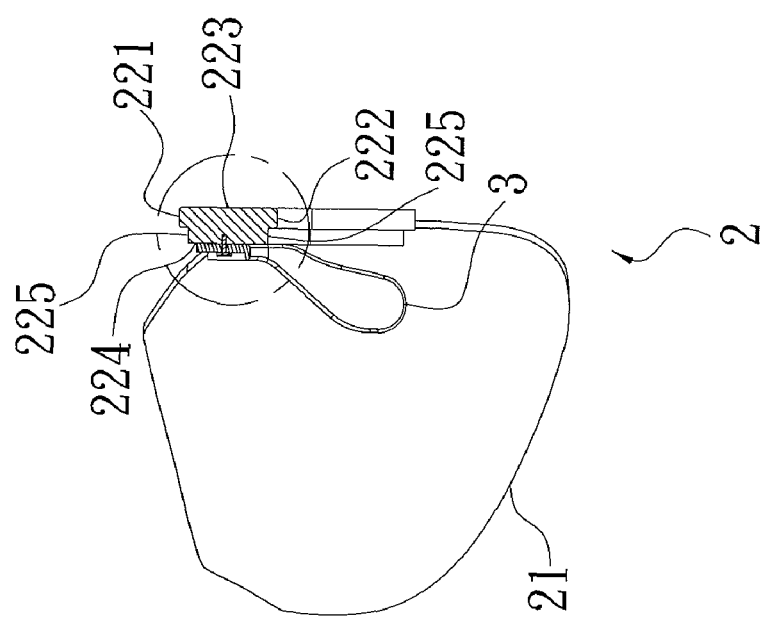

A lens unit 2 comprises two lenses 21 and a connecting piece 22 between the two lenses 21 having a top 221 and a bottom 222 in height direction. The connecting piece 22 further has a first surface 223 (as shown in FIG. 6) and a second surface 224, wherein the first surface 223 faces the inner surface 153 on the intermediate 15 of the frame 1 and the second surface 224 has a nose pad 3 mounted thereon. The connecting piece 22 substantially has a height the same with one of the recess 161 and is made of resilient material so that the connecting piece 22 is snugly engaged the recess 161 on the connecting base 16. The second surface 224 of the connecting piece 22 has a top and bottom respectively defining a groove 225. When the connecting piece 22 on the lens unit 2 is located into the recess 161 of the connecting base 16, the flanges 166 on the opening 162 of the recess 161 are locked into the groove 225 of the connecting piece 22 for positioning. Moreover, the connecting piece 22 has a second distance D″ in thickness direction substantially same with the distance D′ inside the recess 161 (as shown in FIGS. 6 and 7).

In this preferred embodiment, the recess 161 on the connecting base 16 of the frame 1 are open at two side ends. Except the connecting piece 22 and the connecting base 16 are snugly engaged, the first surface 223 on the connecting piece 22 also contacts the inner surface 153 on the intermediate 15 of the frame 1 so that the frame 1 and the lens unit 2 are combined in multi-dimensional abutting status. The connecting piece 22 made of resilient material is pressed to wedge into the recess 161 of the connecting base 16 to achieve tight and firm combination.

Moreover, the connecting piece 22 further has two slits 24 defined at two distal sides with sufficient depth to receive partial periphery of the lenses to make combination of the lenses and the connecting piece 22 firm.

According to above description, the eyeglass device with a detachable lens unit in the present invention has the following advantages:

1. The frame 1 and the lens unit 2 respectively have the connecting base 16 and the connecting piece 22 to perform the multi-dimensional combination. By making the connecting piece 22 of resilient material, the lens unit 2 can be snugly attached and conveniently detached.

2. When the eyeglass device is assembled or disassembled, the user holds the connecting piece 22 of the lens unit 2 to process the assembly or disassembly without touching the lenses 21 so that the lenses 21 are not damaged in operation.

Although this invention has been described in its preferred form with a certain degree of particularity, it is understood that the present invention of the preferred form has been made only by way of example and that numerous changes in the details of construction and the combination and arrangement of parts any be resorted to without departing from the spirit and scope of the invention.

What is claimed is:

1. An eyeglass device with a detachable lens unit comprising
   a frame having
      a first end and a second end respectively connecting to a foot;
      an intermediate between the first end and the second end having an upper edge and a lower edge in height direction and an inner surface and an outer surface in thickness direction;
      a connecting base extends from the intermediate and having a recess extending from an interior surface of the connecting base to an outside surface of the connecting base but not reaching the outside surface, wherein the recess further has an opening, a top and a bottom of the opening, and two flanges respectively formed on the top and bottom of the opening;
   a lens unit having
      two lenses and a connecting piece bridging between the two lenses;
      the connecting piece having a top and a bottom in height direction and a first surface and a second surface in thickness direction, wherein the first surface faces the inner surface on the intermediate of the frame and the second surface has two grooves respectively defining at the top and the bottom of the connecting piece to engage the flanges of the frame.

2. The eyeglass device with the detachable lens unit as claim in claim 1, wherein the interior surface of the connecting base is same as the inner surface on the intermediate of the frame.

3. The eyeglass device with the detachable lens unit as claim in claim 1, wherein the recess has a first distance in thickness direction and a connecting piece further has a second distance substantially the same with the first distance of the recess.

4. The eyeglass device with the detachable lens unit as claim in claim 1, wherein a length of the connecting piece in height direction is substantially the same with a height of the recess in height direction.

5. The eyeglass device with the detachable lens unit as claim in claim 1, wherein the connecting piece further has two slits defined at two distal sides to receive partial periphery of the lenses.

6. The eyeglass device with the detachable lens unit as claim in claim 1, wherein the second surface on the connecting piece has a nose pad.

* * * * *